United States Patent
Danisik et al.

(10) Patent No.: US 10,924,507 B2
(45) Date of Patent: Feb. 16, 2021

(54) AUTO CONFIGURATION SERVER AND METHOD

(71) Applicant: Alcatel Lucent, Nozay (FR)

(72) Inventors: Bahadir Danisik, Austin, TX (US); Jigang Yang, Cedar Park, TX (US)

(73) Assignee: Alcatel Lucent, Nozay (FR)

( * ) Notice: Subject to any disclaimer, the term of this patent is extended or adjusted under 35 U.S.C. 154(b) by 137 days.

(21) Appl. No.: 15/753,451

(22) PCT Filed: Aug. 31, 2016

(86) PCT No.: PCT/EP2016/070489
§ 371 (c)(1),
(2) Date: Feb. 19, 2018

(87) PCT Pub. No.: WO2017/042069
PCT Pub. Date: Mar. 16, 2017

(65) Prior Publication Data
US 2018/0241772 A1    Aug. 23, 2018

(30) Foreign Application Priority Data

Sep. 10, 2015  (EP) .................................. 15306380

(51) Int. Cl.
*H04L 29/06*     (2006.01)
*H04L 12/28*     (2006.01)
*H04L 29/08*     (2006.01)

(52) U.S. Cl.
CPC ...... *H04L 63/1466* (2013.01); *H04L 12/2898* (2013.01); *H04L 67/1004* (2013.01)

(58) Field of Classification Search
None
See application file for complete search history.

(56) References Cited

U.S. PATENT DOCUMENTS

| 7,574,508 | B1 | 8/2009 | Kommula |
| 2002/0018470 | A1* | 2/2002 | Galicki ............... H04L 12/4625 370/392 |
| 2006/0215581 | A1* | 9/2006 | Castagnoli ........ H04W 56/0015 370/254 |
| 2009/0252062 | A1 | 10/2009 | Justen et al. |

(Continued)

FOREIGN PATENT DOCUMENTS

| CN | 1706167 A | 12/2005 |
| CN | 101383812 A | 3/2009 |
| CN | 101989975 A | 3/2011 |
| JP | 2010-530149 A | 9/2010 |
| JP | 2012-501562 A | 1/2012 |

(Continued)

OTHER PUBLICATIONS

Petersson M et al: "Forwarded HTTP Extension", RFC 7239, Internet Engineering Task Force, Jun. 7, 2014 (Jun. 7, 2014).

(Continued)

*Primary Examiner* — William J. Goodchild
(74) *Attorney, Agent, or Firm* — Harness, Dickey & Pierce, P.L.C.

(57) ABSTRACT

An Auto Configuration Server is coupled via at least one Load Balancer in a broadband network to at least one device, including at least one gateway device, in at least one home network. The Auto configuration Server remotely manages the devices by using the CPE WAN Management Protocol CWMP on top of the Hypertext Transfer Protocol http.

4 Claims, 1 Drawing Sheet

(56) References Cited

U.S. PATENT DOCUMENTS

2009/0288165 A1* 11/2009 Qiu .................. H04L 63/14
                                                  726/23
2013/0013752 A1*  1/2013 Herrera Van Der Nood ..............
                                              H04L 41/0889
                                                  709/220

FOREIGN PATENT DOCUMENTS

| JP | 2013-534104 A | 8/2013 |
|---|---|---|
| WO | WO-2007/110951 A1 | 10/2007 |
| WO | WO-2014/146996 A1 | 9/2014 |

OTHER PUBLICATIONS

Boucadair M et al: "Analysis of Potential Solutions for Revealing a Host Indentifier (HOST_ID) in Shared Address Deployments", RFC 6967, Internet Engineering Task Force, Jun. 18, 2013 (Jun. 18, 2013).
The Broadband Forum: "TR-069 CPE WAN Management Protocol—Issue: 1 Amendment 5", Nov. 1, 2013 (Nov. 1, 2013).
International Search Report PCT/ISA/210 for International Application No. PCT/EP2016/070489 dated Aug. 31, 2016.
Written Opinion of the International Searching Authority PCT/ISA/237 for International Application No. PCT/EP2016/070489 dated Aug. 31, 2016.
Patent Cooperation Treaty, PCT/IB/304 for International Application No. PCT/EP2016/070489 dated Aug. 31, 2016.
Chinese Office Action for corresponding Chinese Application No. 201680051729.9 dated Mar. 16, 2020.

* cited by examiner

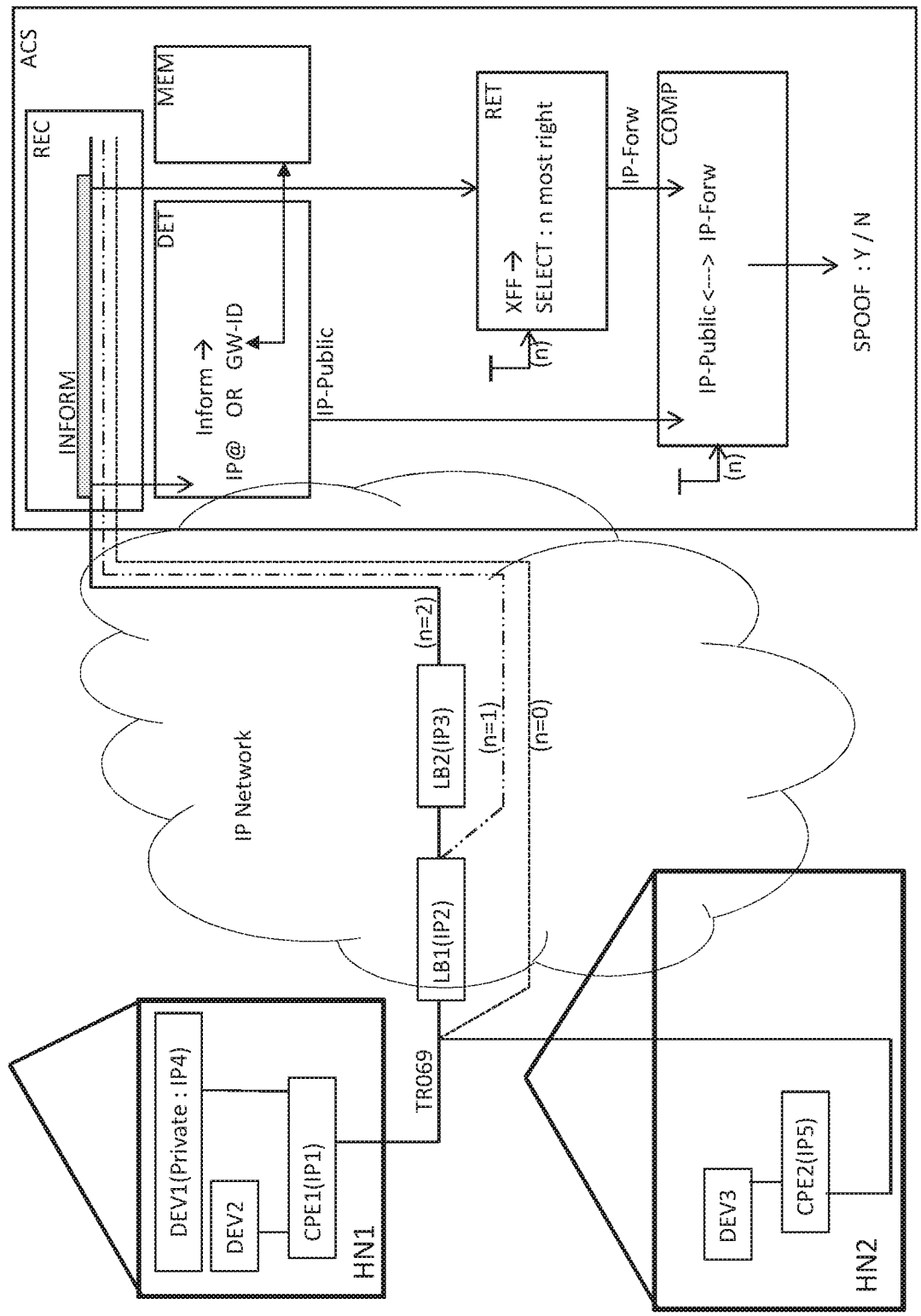

AUTO CONFIGURATION SERVER AND METHOD

CROSS-REFERENCE TO RELATED APPLICATIONS

This application is a national phase under 35 U.S.C. § 371 of PCT International Application No. PCT/EP2016/070489 which has an International filing date of Aug. 31, 2016, which claims priority to European Application No. 15306380.5, filed Sep. 10, 2015, the entire contents of each of which are hereby incorporated by reference.

BACKGROUND

The present invention relates to an Auto Configuration Server to prevent internet protocol address spoofing and related method.

Such an Auto Configuration Server, or shortly ACS, is known in the art and is coupled eventually via one more Load Balancers in a broadband network to different kind of devices such as gateway devices and Local Area Network devices, LAN devices, in a home network.

It is remarked that the named load balancers in this applications can as well be implemented by reverse/forward proxies.

Such an Auto Configuration Server is enabled to remotely manage the devices in the different home networks by means of the Customer Premises Equipment Wide Area Network Management Protocol, shortly CPE WAN Management Protocol CWMP, on top of the Hypertext Transfer Protocol, shortly http.

The Broadband Forum TR-069 (Technical Report 069) defines this CWMP protocol and its Remote Procedure Call messages RPC as Simple Object Access Protocol SOAP messages.

Devices in the home network either a gateway or the LAN devices i.e. user devices behind the gateway are sending TR-069 Inform messages to communicate with the ACS servers. The devices are calling the Inform method to initiate a transaction sequence whenever a Session with an ACS is established.

These Inform messages can be triggered because of an event like Boot, Bootstrap of device, Value Change of a parameter or it can be a Periodic Inform which is scheduled periodically by the ACS.

An Inform message being transmitted by a device such as gateway contains a public Internet Protocol address of the gateway according to the TR-069 data model parameter like e.g.: InternetGatewayDevice.WANDevice.1.WANConnectionDevice.1.WANIPConnection.2.ExternalIPAddress= 156.20.25.67

Such a public Internet protocol address, public IP address, might be used by the Operations Support System during the device service provisioning. Indeed, an ACS can further report the public IP address to the Operations Support System and based on the public IP address, the Operations Support System might correlate the public IP address to a particular customer's profile, and configure the device with customer specific data which can include service related parameters and passwords.

In this way an attacker could gain unauthorized access to third-party service credentials for the spoofed device and perform illegal activities by spoofing the public IP address in the Inform message.

A general way to prevent internet protocol address spoofing is performed by the ACS server by checking the public IP address in the Inform message with the client's IP address i.e. the IP address of the device that transmitted the Inform message. This client IP address can be retrieved either from internet protocol packet or in the event when there are Reverse/Forward Proxies or load balancers in between the device and the ACS, it can be retrieved from the X-Forwarded-For Http header. In the event when both addresses do match, the Inform message can be processed, if they do not match, the Inform message is dropped as spoofing.

It has to be explained that in the event when there are one or more reverse/forward proxies and/or Load Balancers in between the device and the Auto Configuration Server, than the public IP address is read from the X-Forwarded-For attribute. The X-Forwarded-For attribute holds the list of Internet Protocol addresses, with a comma separated, starting from the originated address.

The general format is:
X-Forwarded-For: IP address of client, IP address of proxy1, IP address of proxy2.

The first-most being the original client. In practice this is often called the "left-most". It means that the IP address of the client is entered in the field at a predetermined place for such first addresses. Each successive proxy or load balancer that passed the message is adding the IP address of the network element from which it received the request from. Hereafter, such an IP address in such a list is called "Forwarded IP address". The one after the other IP address is entered in the list according to predetermined rules that respect the sequence of passing the message.

An attacker could however spoof the X-Forwarded-For http header attribute and add a fake Internet Protocol Address.

For example, in the event when a customer premises equipment is contacting auto configuration server ACS according to the following route:
CPE (ip1)→LB (ip2)→LB (ip3)→ACS (ip4)
With
CPE: Customer Premises Equipment
LB: Load Balancer
ACS: Auto Configuration Server
With between brackets the internet protocol address of the device. The X-Forwarded-For list should be: "ip1, ip2" at the moment when the request is received by the ACS. The ACS will read the first-most IP address as the public IP address i.e. indeed the CPE's IP address.

However if the hacker spoofs the header and sends an X-Forwarded-For: (ip5) in the first message, the ACS will receive another list: "ip5, ip1, ip2". The ACS will read again a value for the Forwarded IP address as being the first-most IP address (left-most). This Forwarded IP address is however not the CPE's IP address but it is (ip5), the address of the hacker. This is an indication of spoofing.

However, in the event when the hacker goes up one more level and in addition also in the Inform message changes the public IP address, both addresses will line up i.e. the public IP address and the Forwarded IP address will line up again. The hacker device with the ip5 address can gain access to the information intended for the spoofed device (CPE(ip1)) as for example, credentials and configurations.

SUMMARY

An object of the present invention is to provide a method for execution by an Auto Configuration Server and an Auto Configuration Server itself of the above known type but wherein a solution is provide to still recognize hackers in the event when both kinds of spoofing were introduced.

Indeed, a method to prevent internet protocol address spoofing for execution by an Auto Configuration Server being coupled via at least one Load Balancer in a broadband network to at least one device, comprising at least one gateway device, in at least one home network is provided. The method comprises remotely managing the device by using the CPE WAN Management Protocol on top of the Hypertext Transfer Protocol. The method further comprises the steps of receiving by a receiver from the device a CWMP INFORM message; and a step of determining by a determiner from the message according to the CWMP data model parameter a public IP address of the gateway device; and a step of retrieving by a retriever from a X-Forwarded For field in a http header field at the http level of the message a Forwarded IP address; and a step of comparing by a comparator both determined addresses i.e. the public IP address and the Forwarded IP address and deciding based here on whether spoofing is present.

However in difference to the know methods and known Auto configuration Servers, the ACS of the present invention executes the above step of retrieving by firstly predetermining a number (n) of the at least one load balancers, according to a network topology in the broadband network, through which the CWMP messages passes in order to reach the Auto Configuration Server; and secondly by selecting the Forwarded IP address out from the X-Forwarded For field in function of the n-most last IP address.

So, according to the invention, the object is achieved due to the fact that the solution specifies the number of proxies (n) in the network topology that the device passes through to reach the ACS and to read the Forwarded IP address based on this configuration i.e. in function of this number (n).

BRIEF DESCRIPTION OF THE DRAWINGS

The above and other objects and features of the invention will become more apparant and the invention itself will be best understood by referring to the following description of embodiments taken in conjuction with the accompanying drawings wherein:

FIG. 1 is a Broadband communication network according to some exampe embodiments.

DETAILED DESCRIPTION

The inventor provided the insight that the first-most IP address (left most) of the list of Forwarded addresses in the X-forwarded For field is not consistently providing at the http level the address of the device that effectively did send the Inform message but that with an effective selection this device can be found by the ACS based on the topology of the Broadband network.

It has to be explained that LAN devices and GW devices are having different set of parameters in its Inform messages.

For the LAN devices behind a gateway, the data model parameters starts with "Device" i.e. Device.LAN.IPAddress.

For gateway devices it starts with "InternetGatewayDevice" i.e.

"InternetGatewayDevice.WANDevice.1.WANConnectionDevice.1.WAN IPConnection.2.ExternalIPAddress".

In this way the ACS can recognize from the data model parameter that the Inform message comes from a gateway device of from a LAN device.

Furthermore, the public IP address is determined by the ACS in a different way for the LAN devices as for the gateway devices.

Another characteristic feature of the present invention is that in the event when the CWMP Inform message is a Gateway Inform message coming indeed from a gateway device in a home network, the step of determining a public IP address of the gateway device comprises:

a step of retrieving the public IP address according to the CWMP data model parameter from the IP address field of the sender of the message.

In this way, for the type of Gateway Inform message, the public IP address is directly retrieved from a field in the Inform message.

However, for LAN devices, the IP address field of the sender of the message is not useful since it is the private IP address at home like e.g. "192.168.1.3". So, in the event when the CWMP Inform message is a LAN device Inform message, the step of determining a public IP address of the gateway device comprises a step of retrieving a gateway identifier from the message according to the CWMP data model parameter; and a step of looking up from a data store/memory of the Auto Configuration Server the public IP address based upon the gateway identifier.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a Broadband Network with an Auto configuration Server.

The working of the Auto Configuration Server according to the present invention in accordance with its telecommunication environment that is shown in FIG. 1 will be explained by means of a functional description of the different blocks shown therein. Based on this description, the practical implementation of the blocks will be obvious to a person skilled in the art and will therefore not be described in details. In addition, the principle working of the method to prevent internet protocol address spoofing will be described in further detail.

Referring to FIG. 1 a Broadband communication network is shown. The Broadband communication network comprises at least two home networks: Home Network 1 HN1 and Home Network HN2 are shown.

Home Network 1 HN1 comprises at least one device namely DEV1, DEV2 and CPE1, with at least one gateway which is CPE1. Gateway CPE1 has the IP address IP1 and the two LAN devices DEV1 and DEV2 each have a private IP address e.g. DEV1 has a private IP address IP4.

Home Network 2 HN2 comprises at least one device DEV1 and CPE2, with at least one gateway CPE2. Gateway CPE2 has the IP address IP5 and the LAN device DEV3 has a private IP address (not shown).

Both Home Networks are coupled over the Broadband IP network to an Auto Configuration Server ACS. The Home Networks are coupled to the ACS either via two load balancers (full line) LB1 and LB2 or via only one load balancer (full line in combination with a dot and stripe line) LB1 or via no load balancer (full line in combination with a dotted line). It has to be explained that only one of the three above mentioned topologies is implemented at a same time in the network.

However the three different topologies have different consequences for the global procedure of an ACS to prevent internet protocol address spoofing and will hereby all explained. A further remark is that the present invention is not limited to broadband networks having a topology that connects home devices to auto configuration servers via zero, one or two load balancers/proxy's. The invention is applicable to broadband networks with a topology having any number of load balancers/proxy's in between these two network elements.

The Load Balancers LB1 and LB2 have respectively an IP address IP2 and IP3.

The Auto Configuration Server comprises a Receiver REC to which the home devices are coupled, a determiner DET coupled to the receiver, a data store (MEM) coupled to the determiner DET, a retriever RET coupled to the Receiver and a comparator COMP coupled to the determiner and to the retriever.

The receiver REC is included to receive from one of the devices CPE1, DEV1, DEV2, CPE2, DEV3, . . . a CWMP Inform message INFORM. It has to be remarked that the device that sends the Inform message is either a LAN device or one of the gateways itself.

The Determiner DET is included to determine from the Inform message according to the CWMP data model parameter the public IP address of the gateway device. This determined IP address is called public IP address and is shown in FIG. 1 as "IP-Public".

The retriever RET is included to retrieve from the X-Forwarded For field XFF in the http header field at the http level of the Inform message an IP address. This retrieved IP address is called "Forwarded IP address" and is shown in FIG. 1 as IP-Forw. According to the present invention the retriever RET is further enabled to select the Forwarded IP address IP-Forw in the X-Forwarded For field XFF in function of the n-most last IP address, with the number (n) being a predetermined number of the at least one load balancers LB1 and/or LB2 according to a network topology in the broadband network, through which the CWMP messages passes in order to reach the Auto Configuration Server (ACS). As explained above, the "X-Forwarded For" field holds a list of IP addresses that are separated by a comma. The list comprises a first-most IP address being the originated address of the original client. When the message passes each successive load balancer or proxy, that network element adds the IP address of the network element from which it received the message from. In this way a list of IP addresses is built up and received in the global INFORM message by the Auto Configuration Server. Selecting an IP address, called the "forwarded IP address" from this list in the X-forwarded For field in function of the n-most last IP address means that counting starts from the last added IP address in the list and continues in reverse order as how the list was built up.

The comparator COMP is included to compare the public IP address IP-Public with the Forwarded IP address IP-Forw and to decide based here on whether spoofing is present.

The different steps of the method according to the invention will be described now here below:

A particular device will send an Inform message to the Auto Configuration Server. It is the object of the ACS to determine internet protocol address spoofing if it would be present. The ACS executes there for the following steps:
   a step of receiving from the device a CWMP Inform message; and
   a step of determining from the message according to the CWMP data model parameter a public IP address, IP-Public, of the gateway device; and
   a step of retrieving from a X-Forwarded For field XFF in a http header field at the http level of the Inform message a Forwarded IP address, IP-Forw. In order to execute this retrieving step, the following two substeps are performed:
      predetermining a number (n) of all the load balancers LB1 and/or LB2, according to a network topology in the broadband network, through which the CWMP messages passes in order to reach the Auto Configuration Server (ACS); and;
      selecting the Forwarded IP address, IP-Forw, in the X-Forwarded For field XFF in function of the n-most last IP address; and
   a step of comparing the public IP address, IP-Public, with the Forwarded IP address, IP-Forw, and deciding based here on whether spoofing is present.

Furthermore in the event when the CWMP Inform message is a Gateway Inform message whereby the above step of determining the public IP address, IP-Public, comprises a step of retrieving this public IP address, IP-Public, according to the CWMP data model parameter from the IP address field of the sender of the message.

It has to be remarked that in the event when LAN devices such as e.g. DEV1, DEV2 or DEV3 are sending the Inform message, they are also sending its IP address in the Inform. However, this IP address is only a local IP address. These devices are as well sending in the Inform message their gateway info such as e.g. for DEV1 a CPE1 identifier or Gateway Identifier, GW-ID. The idea is to find the IP address of the gateway based upon the gateway Identifier by means of lookup using a data store of the ACS. Finally this looked up IP address is compared to the one of the XFF field. So, in the event when the CWMP Inform message is a LAN device Inform message the step of determining comprises two substeps:
   a step of retrieving a gateway identifier GW-ID from the message according to the CWMP data model parameter; and
   a step of looking up from a data store MEM of the Auto Configuration Server the public IP address based upon the gateway identifier.

It has to be remarked that the method of the present invention can be integrated in an overall procedure for detecting internet protocol address spoofing in the event of different values for "n". Such an overall procedure comprises different rules and conditions which are further executed by the ACS in order to support finally the comparator in its step of deciding whether spoofing is present.

A possible implementation is abstractly provided here below.

1) If the value n is zero: n=0, there should be no proxy/Load Balancer present in the network topology. See the dotted line in FIG. 1. The IP address from the IP layer is directly retrieved from IP packet. In the event when there would exist an X-Forwarded-For header, the Inform message is treated as spoof.

So if a device sends an Inform message:
Without X-Forwarded-For header: Read the public IP address from the IP layer.
With X-Forwarded-For header: Read the public IP address from the IP layer and indicate the message as spoof.

2) If the value n is bigger as zero: n>0, the n'th IPaddress is read from the last entry (right) of the X-Forwarded-For Http header as the originating IP address.

In the example of the full line in FIG. 1, for an Inform message coming from a hacker CPE2(ip5) that simulates that CPE1(ip1) did send the message, the XFF list looks like: "ip1, ip5, ip2". With n=2, "ip5" is considered as the originating address of the device.

Once the Public IP address of the device is determined:
For TR0-69 Gateway Devices: Compare the public IP address with the CWMP data model IP address in the Inform message. If they do not match, this is a spoofing.
For TR0-69 LAN Devices: Determine the CWMP data model gateway Identifier and lookup in the data store the public IP address of the gateway and compare both addresses. If they do not match, this is also spoofing.

So, if a device sends an Inform message:
Without X-Forwarded-For header: Can't read the header. Configuration error. Inform message rejected.
X-Forwarded-For: Read the n-the (n) last-most (rightmost) IP address. If it contains more entries, it is spoofing.

It has to be remarked here also that the present invention is not limited to values for n being zero, one or two. As explained above, the invention is valid for broadband networks with any number of load balancers in between the devices and the auto configuration server, which means that the invention can be applied with any value for the "n".

A number of examples are provided now here below in order to further show the working of a possible global procedure that uses the principle of the invention.

Different network topologies with different values for n are described. The applicable topology for the different values of n can be followed in FIG. 1:

n=0 the sequence of the full line followed by the dotted line from the devices towards the ACS; and
n=1 the sequence of the full line from the devices via LB1 and the dots/stripes line towards the ACS; and
n=2 the full line via LB1 and LB2.

Examples are provided each time for gateways and the devices behind the gateway.

Each time, firstly (a) a normal situation is explained i.e. normal behavior and no spoofing was introduced. Secondly (b) one level of spoofing is described and explained. This spoofing is introduced on the CWMP level. IP Address or gateway identifier in the Inform message is spoofed. Finally (c) two levels of spoofing are introduced i.e. similar as in (b) and in addition also at the level of X-forward For field.

I. Topology n=0
1) TR069 Gateway Devices: (CPE1, CPE2) coupled directly to ACS
a) Normal: GW Inform message from CPE1(IP1) to ACS:
Compare: IP@ from CWMP (=IP1) with IP Layer Source IP@ (=IP1)=>ok b) Spoof by CPE2(IP5): False (IP1) GW Inform message from CPE2 (IP5) to ACS:
Compare: IP@ from CWMP (=IP1) with IP Layer Source IP@ (=IP5)=>Spoof
c) Spoof by CPE2(IP5): False (IP1 and XFF (IP1)) GW inform message from CPE2(IP5) to ACS=>XFF (IP1)
Compare: IP@ from CWMP (=IP1) with IP@ from IP layer (n=0) (=IP5)=>Spoof 2) TR069 LAN Devices (DEV1, DEV2, DEV3) via its GW coupled directly to ACS
a) Normal: Device Inform message from DEV1(IP4) via CPE(IP1) to ACS:
Compare: Looked up GW IP@ from CWMP (=IP1) with IP Layer Source IP@ (=IP1)=>ok
b) Spoof by DEV3: False (gateway identifier=CPE1) Device Inform message from DEV3 to ACS:
Compare: Looked up GW IP@ from CWMP (=IP1) with IP Layer Source IP@ (=IP5)=>Spoof
c) Spoof by DEV3: False (gateway identifier=CPE1 and XFF (IP1)) Device Inform message from DEV3 to ACS=>XFF(IP1)
Compare: Looked up GW IP@ from CWMP (=IP1) with IP@ from IP layer (n=0) (=IP5)=>Spoof II. Topology n=1
1) TR069 Gateway Devices (CPE1, CPE2) coupled via LB1 to ACS
a) Normal: GW Inform message from CPE1(IP1) via LB1 (IP2) to ACS=>XFF(IP1)
Compare: IP@ from CWMP (=IP1) with XFF IP@ with n=1(=IP1)=>ok
b) Spoof by CPE2(IP5): False (IP1) GW Inform message from CPE2(IP5) via LB1(IP2) to ACS=>XFF(IP5)
Compare: IP@ from CWMP (=IP1) with XFF IP@ with n=1 (=IP5)=>Spoof
c) Spoof by CPE2(IP5): False (IP1 and XFF (IP1)) GW inform message from CPE2(IP5) via LB1(IP2) to ACS=>XFF (IP1, IP5)
Compare: IP@ from CWMP (=IP1) with XFF IP@ with n=1 (=IP5)=>Spoof 2) TR069 LAN Devices (DEV1, DEV2, DEV3) via its GW coupled via LB1 to ACS
a) Normal: Device Inform message from DEV1(IP4) via CPE1(IP1) and via LB1(IP2) to ACS=>XFF(IP1)
Compare: Looked up GW IP@ from CWMP (=IP1) with XFF IP@ with n=1(=IP1)=>ok
b) Spoof by DEV3: False (gateway identifier=CPE1) Device Inform message from DEV3 via LB1(IP2) to ACS=>XFF (IP5)
Compare: Looked up GW IP@ from CWMP (=IP1) with XFF IP@ with n=1 (=IP5)=>Spoof
c) Spoof by DEV3: False (gateway identifier=CPE1 and XFF (IP1)) Device Inform message from DEV3 via LB1 (IP2) to ACS=>XFF(IP1, IP5)
Compare: Looked up GW IP@ from CWMP (=IP1) with XFF IP@ with n=2 (=IP5)=>Spoof III. Topology n=2
1) TR069 Gateway Devices (CPE1, CPE2) coupled via LB1 and LB2 to ACS
a) Normal: GW Inform message from CPE1(IP1) via LB1 (IP2) and LB2(IP3) to ACS=>XFF(IP1, IP2)
Compare: IP@ from CWMP (=IP1) with XFF IP@ with n=2(=IP1)=>ok
b) Spoof by CPE2(IP5): False (IP1) GW Inform message from CPE2(IP5) via LB1(IP2) and LB2(IP3) to ACS=>XFF (IP5, IP2)
Compare: IP@ from CWMP (=IP1) with XFF IP@ with n=2 (=IP5)=>Spoof c) Spoof by CPE2(IP5): False (IP1 and XFF (IP1)) GW inform message from CPE2(IP5) via LB1(IP2) and LB2 (IP3) to ACS=>XFF (IP1, IP5, IP2)
Compare: IP@ from CWMP (=IP1) with XFF IP@ with n=2 (=IP5)=>Spoof
2) TR069 LAN Devices (DEV1, DEV2, DEV3) via its GW coupled via LB1 and LB2 to ACS
a) Normal: Device Inform message from DEV1(IP4) via CPE1(IP1) and via LB1(IP2) and LB2(IP3) to ACS=>XFF (IP1; IP2)
Compare: Looked up GW IP@ from CWMP (=IP1) with XFF IP@ with n=2(=IP1)=>ok
b) Spoof by DEV3: False (gateway identifier=CPE1) Device Inform message from DEV3 via LB1(IP2) and LB2(IP3) to ACS=>XFF(IP5, IP2)
Compare: Looked up GW IP@ from CWMP (=IP1) with XFF IP@ with n=2 (=IP5)=>Spoof
c) Spoof by DEV3: False (gateway identifier=CPE1 and XFF (IP1))
Device Inform message from DEV3 via LB1(IP2) and LB2(IP3) to ACS=>XFF(IP1, IP5, IP2)
Compare: Looked up GW IP@ from CWMP (=IP1) with XFF IP@ with n=2 (=IP5)=>Spoof A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to prevent internet protocol address spoofing for execution by an Auto Configuration Server being coupled via at least one load balancer in a broadband network to at least one device comprising at least one gateway device, in at least one home network said method comprises remotely managing said device by using a CPE WAN Management Protocol on top of a Hypertext Transfer Protocol, said method comprises:
   receiving from said device a CWMP Inform message;
   determining from said CWMP Inform message according to a CWMP data model parameter a public IP address of said gateway device;
   retrieving from a X-Forwarded For field in a http header field at a http level of said CWMP Inform message a Forwarded IP address;
   comparing said public IP address with said Forwarded IP address; and
   deciding based on the comparison whether spoofing is present,
   wherein the retrieving includes,
      predetermining a number n of said at least one load balancers, according to a network topology in said broadband network, through which the CWMP Inform message passes in order to reach said Auto Configuration Server; and
      retrieving said Forwarded IP address in said X-Forwarded For field as a function of an n-most last IP address.

2. Said method according to claim 1 wherein said CWMP Inform message is a Gateway Inform message such that the determining comprises:
   retrieving said public IP address according to the CWMP data model parameter from an IP address field of a sender of said CWMP Inform.

3. Said method according to claim 1 wherein said CWMP Inform message is a LAN device Inform message such that the determining comprises:
   retrieving a gateway identifier from said CWMP Inform message according to the CWMP data model parameter; and
   looking up from a data store of said Auto Configuration Server said public IP address based upon said gateway identifier.

4. An Auto Configuration Server to prevent internet protocol address spoofing, coupled via at least one load balancer in a broadband network to at least one device comprising at least one gateway device in at least one home network, said Auto Configuration Server being enabled to remotely manage said device by means of a CPE WAN Management Protocol on top of a Hypertext Transfer Protocol, said Auto Configuration Server comprises:
   a receiver configured to receive from said device a CWMP Inform message;
   a determiner configured to determine from said CWMP Inform message according to a CWMP data model parameter a public IP address of said gateway device;
   a retriever configured to retrieve from a X-Forwarded For field in a http header field at a http level of said CWMP Inform message a Forwarded IP address; and
   a comparator configured to compare said public IP address with said Forwarded IP address and to decide based on the comparison whether spoofing is present, wherein said retriever is enabled to select said Forwarded IP address in said X-Forwarded For field as a function of an n-most last IP address, said number n being a predetermined number of said at least one load balancers, according to a network topology in said broadband network, through which the CWMP Inform message passes in order to reach said Auto Configuration Server.

* * * * *